Nov. 23, 1965 M. G. DOMSITZ 3,218,947
PHOTOFLASH SYNCHRONIZATION SYSTEM
Filed Oct. 24, 1956

INVENTOR.
MYRON G. DOMSITZ
BY
W. E. Thibodeau, A. W. Dew & J. P. Edgerton
Attorneys.

United States Patent Office 3,218,947
Patented Nov. 23, 1965

3,218,947
PHOTOFLASH SYNCHRONIZATION SYSTEM
Myron G. Domsitz, Dobbs Ferry, N.Y., assignor to the United States of America as represented by the Secretary of the Army
Filed Oct. 24, 1956, Ser. No. 618,157
9 Claims. (Cl. 95—11.5)
(Granted under Title 35, U.S. Code (1952), sec. 266)

The invention described herein may be manufactured and used by or for the Government for governmental purposes without the payment to me of any royalty thereon.

This invention relates to a photoflash synchronization system and more particularly to the detonation of a photoflash bomb dropped from an aircraft and synchronization of the opening of the shutter of a camera on the aircraft with the detonation of the bomb.

Heretofore the practice has been to drop the bomb with self-contained means for delayed detonation. A photo sensitive device on the aircraft was designed to respond rapidly to relatively low level illumination from the bomb at the beginning of detonation. This photosensitive device caused the camera shutter to become fully open by the time the photoflash bomb had reached its optimum illumination. This method was satisfactory with flash bombs that built up to their optimum illumination relatively slowly in combination with camera shutters that open relatively rapidly. As greater demands were made on night photoreconnaissance, however, more powerful photoflash bombs were developed that reached their optimum illumination more rapidly. At the same time, particularly for high altitude photoreconnaissance, large diameter lenses came into use. Consequently the larger shutters needed for these lenses took longer to open than the bomb took to reach its optimum illumination. Thus a synchronization system adapted to perform satisfactorily with present as well as substantially all photoreconnaissance equipment and methods is extremely desirable.

Accordingly, it is a principal object of this invention to provide means for synchronization of camera shutter openings with optimum illumination of flash bombs.

Another object is to provide means for synchronization of camera shutter opening with optimum illumination of flash bombs, wherein the synchronization is dependent upon predetermined signal transmission and suitable time delays.

The essence of the invention is the transmission, from a dropped bomb to the bomb-dropping aircraft, of a precursor signal that energizes means for opening a camera shutter. Timing means in the bomb fuze first cause transmission of this signal to a receiver in the aircraft, then after suitable delay, in order that the shutter opens fully, cause the detonation of the bomb.

The specific nature of the invention as well as other objects, uses and advantages thereof will clearly appear from the following description and from the accompanying drawings, in which.

Figure 1:
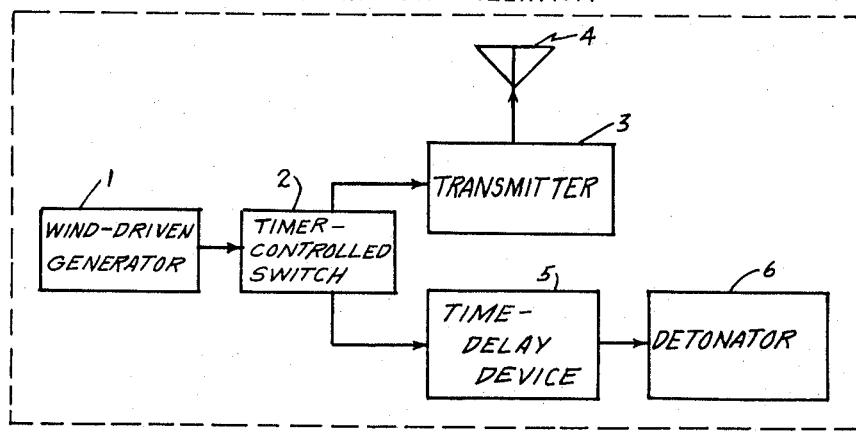
FIGURE 1 is a block diagram of a transmitting and detonating system of a bomb installation.

Referring to FIGURE 1, as the bomb falls its descent may rotate a conventional missile mounted wind-driven generator 1 to produce an electrical voltage. As the bomb leaves the aircraft an adjustment clockwork timing mechanism in a timer controlled switch 2 is put in operation. Before the bomb is dropped, aircraft personnel may set this mechanism so that it will operate switch 2 after the desired interval of time, or when the bomb is at the desired height above the ground. Alternatively, this preset time delay may be initiated at bomb launching as is conventionally done with safety and arming mechanisms responsive to setback forces.

When switch 2 closes, it applies the voltage from generator 1 to the plate circuit of radio transmitter 3 and causes a radio signal to be radiated from transmitting antenna 4. Filament or heater voltage for transmitter 3 may be furnished by an extra winding on generator 1 or by a battery or other suitable source. Transmitter 3 and antenna 4 may generally assume the form of like devices presently incorporated in missiles for accomplishing verious similar functions. A simple low powered one-tube transmitter may in general be sufficient, such as one comprising a conventional triode oscillator.

Simultaneously with applying plate voltage to transmitter 3, switch 2 applies voltage to an adjustable time delay device 5. The purpose of device 5 is to delay for a predetermined time, usually not more than 50 milliseconds, the application of voltage to a conventional electrical detonator 6. Device 5 is preferably a resistance-capacitance network, but it will be understood by those skilled in the art that a thermal or mechanical or other well known delay device can be used alternatively. When device 5 closes, it applies voltage to detonator 6 and initiates detonation thereof. From what has been said, it will be apparent that the bomb is detonated at a predetermined time after the initial transmission of a radio signal from transmitting antenna 4.

Figure 2:
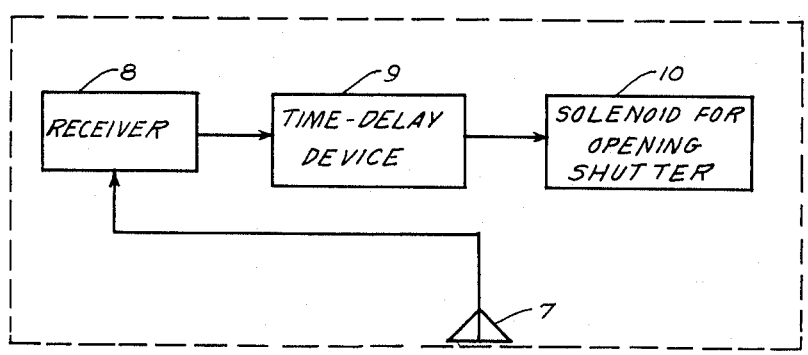
FIGURE 2 is a block diagram of a receiving and camera shutter opening system of an aircraft installation.

Referring to FIGURE 2, the radiated signal from antenna 4 on the bomb is picked up by receiving antenna 7 on the aircraft and applied to the input circuit of a conventional radio receiver 8 to produce a receiver output signal. Suitable amplification means for the received signal may be utilized. The receiver output signal is then applied to an adjustable time delay device 9 and then to a solenoid or other electromechanical device that opens the shutter on the camera. Time delay device 9, like delay device 5, is preferably a resistance-capacitance network but, like device 5, can be of other well known types. It will be understood that if receiver 8 and delay device 9 do not provide enough power to directly operate solenoid 10, a suitable relay may be employed to apply sufficient power from a supplemental power source in the aircraft.

Looking now at the entire system as shown in FIGURES 1 and 2, it will be seen that the closing of timer control switch 2 initiates two actions, each after a short independent delay; the opening of the camera on the aircraft and the detonation of the bomb. Assuming that the delay device 5 in the bomb has a fixed delay, such as 50 milliseconds, suitable adjustment of delay device 9 in the aircraft will give optimum synchronization of almost any shutter and flash bomb combination. Assuming that the shutter opens more slowly than the bomb takes to reach its optimum illumination, the delay time of device 9 will then be made less than that of device 5 by an appropriate amount. If a fast-opening shutter is to be synchronized with a slow-peaking bomb, the delay time of device 9 can be made suitably longer than that of device 5.

Although the system would obviously be applicable to a wide range of radio frequencies, a frequency between 100 and 200 megacycles is desirable. It is preferable that pulsed transmission be utilized, and to facilitate identification and analysis of the received signal it would be desirable for at least five or six successive pulses to be available. The aircraft system would then be adapted to become energized only after a predetermined number of pulses. This is to insure against premature shutter opening by discriminating against undesired signals and noise.

A pulse duration of about 200 milliseconds, a pulse repetition frequency of about 1500 cycles per second, and a transmission period of about 5 milliseconds, may be employed.

The method and system of the invention obviously offer several important advantages. The necessary equipment is relatively simple and inexpensive to construct. The bomb fuze, since it is not detonated by a received signal, would be jam-proof. If receiver jamming were a problem, it could easily be dealt with by transmitter coding, and in any event the fact that the enemy would have no way of knowing whether his jamming efforts were successful would be a distinct advantage.

It will be apparent that the embodiments shown are only exemplary and that various modifications can be made in construction and arrangement within the scope of the invention as defined in the appended claims.

I claim:

1. In a photoflash synchronization system for fully opening a camera shutter when a flash bomb reaches optimum illumination, the combination on board a missile of: a wind-driven generator for supplying electrical energy to said missile system, a timer-controlled switch electrically connected to said generator, a time delay device electrically connected to said switch, a missile detonator electrically connected to said delay device, a transmitter electrically connected to said switch, and an antenna coupled to said transmitter, said combination being so constructed and arranged that energy from said generator is adapted to be applied by said switch to energize said transmitter and said delay device being adapted to apply energy to said detonator after a predetermined time interval after energization of said transmitter.

2. In a photoflash synchronization system for fully opening a camera shutter when a flash bomb reaches optimum illumination, the combination on board an aircraft of: an antenna for picking up signals, a receiver coupled with said antenna and energizable by said signals, a time delay device electrically connected to said receiver, a solenoid electrically connected to said delay device, and a camera shutter coupled with said solenoid, said combination being so constructed and arranged that upon energization of said receiver said delay device will become energized and apply energy to said solenoid which will open fully said shutter after a predetermined time interval after energization of said receiver.

3. In a photoflash synchronization system for fully opening a camera shutter when a flash bomb reaches optimum illumination, a first system responsive to a second system, said second system comprising: means for supplying energy after a preset time interval, transmitter means responsive to said energy for radiating signals, time delayed detonator means responsive to said energy for detonating said bomb after a preset time delay after radiation of said signals; said first system comprising: receiver means responsive to said signals for producing output energy, and time delayed shutter opening means coupled with said receiver means and responsive to said output energy for opening said shutter after a preset time delay after transmission of said signals.

4. In a photoflash synchronization system for fully opening a camera shutter when a flash bomb reaches optimum illumination, a first system responsive to a second system, said second system comprising: a wind-driven generator for supplying electrical energy to said second system, a timer-controlled switch electrically connected to said generator, a first time delay device electrically connected to said switch, and a detonator electrically connected to said first delay device, a transmitter electrically connected to said switch, and a first antenna coupled with said transmitter, said second system being so constructed and arranged that energy from said generator is adapted to be applied by said switch to energize said transmitter and said first delay device after a predetermined time interval, said first antenna adapted to radiate signals supplied by said transmitter when said transmitter is energized, and said first delay device adapted to apply energy to said detonator after a predetermined time interval after energization of said transmitter; said first system comprising: a second antenna for picking up said signals from said first antenna, a receiver coupled with said second antenna and energizable by said signals, a second time delay device electrically connected to said receiver, a solenoid electrically connected to said second delay device, and a camera shutter coupled with said solenoid, said first system being so constructed and arranged that upon energization of said receiver said second delay device will become energized and apply energy to said solenoid which will open fully said shutter after a predetermined time interval after said detonator becomes energized.

5. In a photoreconnaissance system comprising an aircraft, a camera and camera shutter aboard said aircraft, and a photoflash bomb adapted to be dropped from said aircraft, an improved synchronization system for synchronizing the opening of the shutter of said camera with the burst of said bomb, said synchronization system comprising: means for automatically transmitting a signal from said bomb to said aircraft at a predetermined time after the release of said bomb from said aircraft; means for detonating said bomb at a predetermined time interval after the transmission of said radio signal; and means responsive to said radio signal for opening said camera shutter at a predetermined time interval after the reception of said radio signal.

6. The invention according to claim 5, means being provided for adjustment of the time interval that elapses after the transmission of said radio signal before the opening of said camera shutter.

7. In a photoreconnaissance system comprising an aircraft, a camera and a camera shutter aboard said aircraft, and a photoflash bomb adapted to be dropped from said aircraft, an improved synchronization system for synchronizing the opening of the shutter of said camera with the burst of said bomb, said synchronization system comprising: a radio transmitter aboard said bomb; switch means adapted upon closing to energize said radio transmitter and to thereby cause transmission of a radio signal to said aircraft; first delay means for closing said switch after a predetermined interval after the release of said bomb from said aircraft; a detonator; second delay means for firing said detonator after a predetermined time interval after the closing of said switch; a radio receiver aboard said aircraft for receiving said radio signal; an electromechanical device for opening said camera shutter for a short period of time; and third delay means responsive to the output of said radio receiver for actuating said electromechanical device after a predetermined time interval after the reception of said radio signal.

8. The invention according to claim 7, said third delay means being adjustable.

9. The invention according to claim 7, said radio transmitter being powered by a wind-driven generator.

References Cited by the Examiner

UNITED STATES PATENTS 2,405,597 8/1956 Miller _____ 244—14.5
2,764,072 9/1956 Walsh _____ 95—11.5

JOHN M. HORAN, *Primary Examiner.*

N. H. EVANS, *Examiner.*